April 25, 1933. J. H. FLINK 1,905,837
METHOD AND APPARATUS FOR PRODUCING CUT ARTICLES
OR BLANKS FROM PLASTIC STRIP MATERIAL
Filed June 5, 1931 2 Sheets-Sheet 1
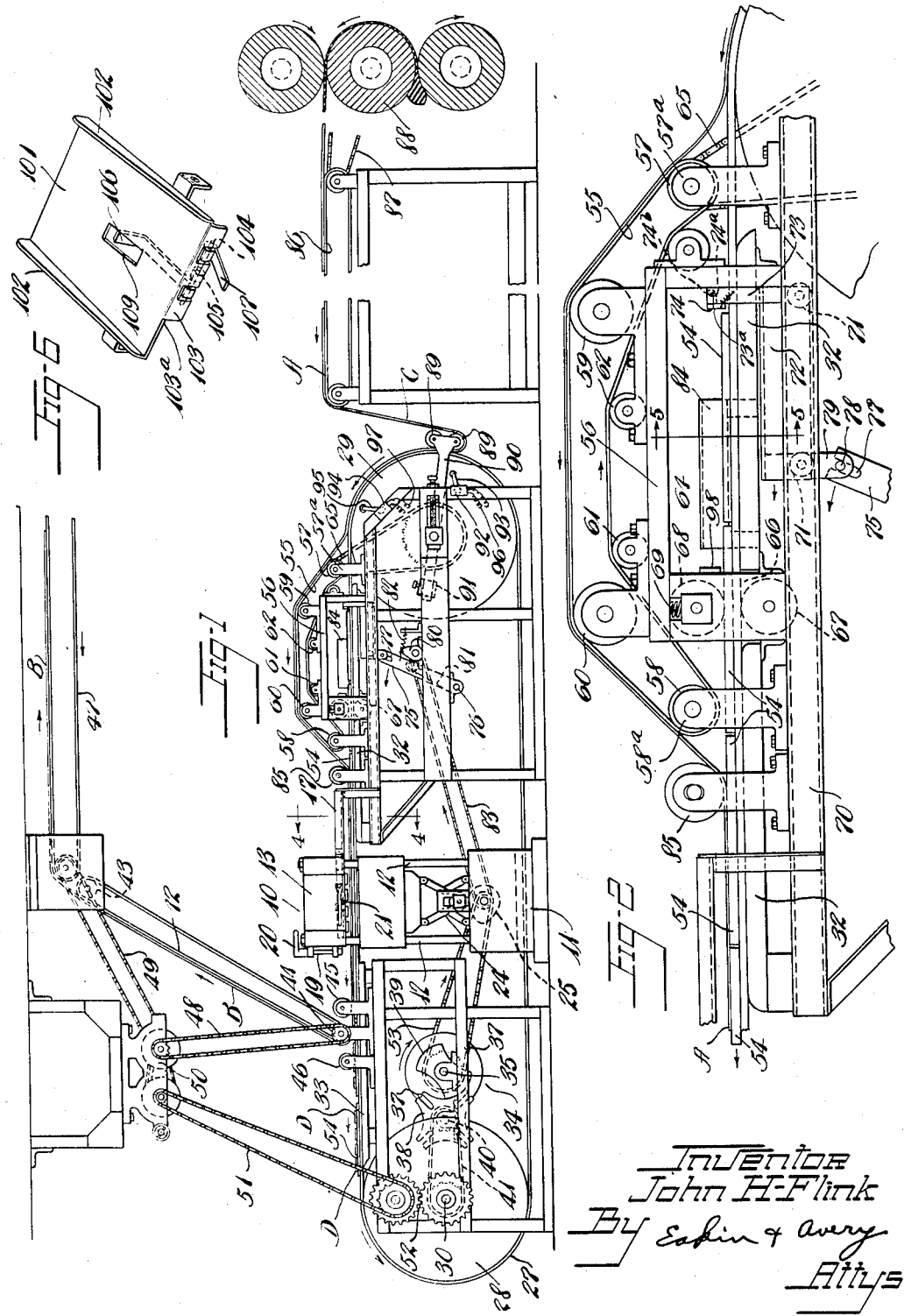
Inventor
John H. Flink
By Eakin & Avery
Attys.

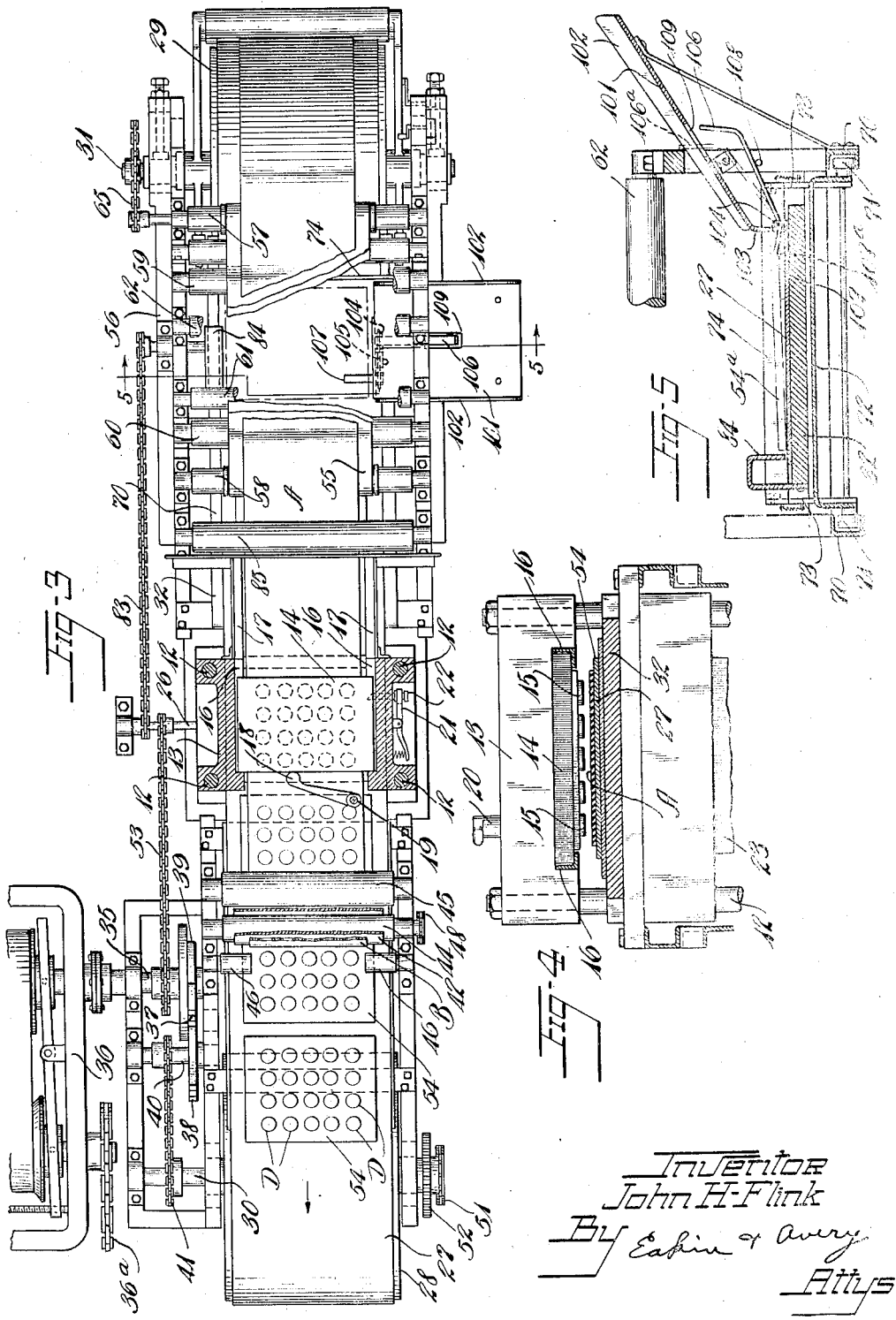

Patented Apr. 25, 1933

1,905,837

UNITED STATES PATENT OFFICE

JOHN H. FLINK, OF WATERTOWN, MASSACHUSETTS, ASSIGNOR TO THE B. F. GOODRICH COMPANY, OF NEW YORK, N. Y., A CORPORATION OF NEW YORK

METHOD AND APPARATUS FOR PRODUCING CUT ARTICLES OR BLANKS FROM PLASTIC STRIP MATERIAL

Application filed June 5, 1931. Serial No. 542,419.

This invention relates to methods and apparatus for producing cut articles or blanks from plastic strip material and is especially applicable to the production of such articles or blanks as rubber shoe parts by cutting them from strip stock.

Such parts have heretofore been produced by a procedure which involves feeding a strip of stock on a conveyor belt through a cutting machine where a die or knife cutter is caused to sever the parts from the strip stock, the parts being fed on by the belt to a position past the cutting machine where they are removed by hand. Owing to the thin, tacky and plastic nature of the stock, removal of the cut parts from the belt without injury to them due to the handling has required careful manipulation by the attendants and the speed of the whole procedure has been limited by the manual removal operation.

A further objection to the prior procedure is that the conveyor belt has been subject to excessive injury by the action of the cutter against its surface and frequent replacement of the belt, with required shut down of the apparatus, has been necessary.

Objects of the invention are to provide procedure and apparatus whereby these and other difficulties are avoided, and whereby the cut parts may be produced rapidly without injury and without requiring a large number of attendants for handling the cut parts as they come from the cutting machine.

More specific objects are to provide for the use of a plurality of cutting boards or mats in conjunction with the strip stock and a conveyor, to provide for interposing the mats between the strip stock and the conveyor consecutively in determinate positions along the latter, to provide for preventing improper positioning of the boards, and to provide for efficiently stripping the surplus strip stock from the boards and cut parts.

Other objects are to provide for quickly making changes in the apparatus for cutting parts of different sizes and shapes, and to provide for coordinated operation of the cutting apparatus and a stock feeding source, such as a calender, to permit feeding of the plastic strip stock without likelihood of undesirable distortion or other injury thereto.

These and further objects will be apparent from the following description of a preferred embodiment of the invention, reference being had to the accompanying drawings, in which:

Fig. 1 is a side elevation of apparatus embodying my invention in its preferred form, parts being broken away and in section. For the sake of clarity, certain parts of the board feeding mechanism, shown in Figs. 3, 5 and 6, are not shown in Figs. 1 and 2.

Fig. 2 is a side elevation on a larger scale of a portion of the apparatus illustrated in Fig. 1, certain parts of the board feeding mechanism being omitted.

Fig. 3 is a plan view of the apparatus with parts broken away and in section.

Fig. 4 is a section on line 4—4 of Fig. 1, on a larger scale.

Fig. 5 is a section on line 5—5 of Fig. 2, showing parts of the board feeding mechanism not illustrated in Fig. 2.

Fig. 6 is a perspective view of the board feeding chute and associated mechanism.

The apparatus of the illustrated embodiment includes a cutting mechanism indicated generally at 10. This comprises a supporting base 11 carrying four corner columns 12, 12 at the upper ends of which is mounted a head 13 formed at its undersurface with a recess for the reception of a die member 14 having downwardly projecting cutting dies 15, 15. The die member is supported in the head 13 by tracks 16, 16 (see Fig. 4) on which the member rests. At one side of the head in extension of the tracks 16, 16 is mounted a pair of rails 17, 17, the arrangement being such that the die member may be slid out from beneath the head 13 and onto the rails 17, 17, where the die member may be exchanged for another, which may then be set in place in the head by simply sliding the member into place on the tracks 16, 16. Thus one die member may be quickly replaced by another for changing the sizes and shapes of the cutting dies.

Speedy removal of the die member from the head is facilitated by the provision of a pushing or kicking lever 18, one end of which is adapted to contact the die member and the other end of which is secured to a vertical shaft 19 mounted for rotation on the head 13 and provided at its upper end with a handle 20. Also mounted upon the head 13 is a pivoted and spring-pressed latch 21, having a pin 22 passing through an aperture in the wall of the head and adapted to engage the die member for holding the same in its proper position in the head. By manual pressure on the latch and manipulation of the handle 20 the die member may be quickly released and forced out onto the rail extensions 17, 17.

Directly beneath the cutting dies and between the columns 12, 12 is provided a space through which strip stock, designated A, may be fed for cutting, and beneath this space is mounted for vertical reciprocation a ram 23 adapted in its upward movement to cause the strip stock to be pressed against the cutting dies and its downward movement to permit the stock to be freed from the dies for its next forward movement. Mechanism for reciprocating the ram comprises a toggle linkage 24 of common construction actuated by a rotating cam 25 mounted on a shaft 26 journalled in the supporting frame.

The strip stock A is fed through the cutting mechanism on an endless conveyor apron 27 which passes over end pulleys 28 and 29, the latter being mounted on shafts 30 and 31 which are suitably journalled in frame supports. The bearings for shaft 31 are preferably adjustably mounted in the frame support, as shown in Fig. 1, for the purpose of adjusting the tension of the endless apron. The apron in its upper reach slides over a supporting table 32 mounted in the framework then through the cutting mechanism 10 where it is engaged at its under surface by the ram 23 and forced upward during the cutting operation, and it then slides over a second supporting table 33 mounted in the framework before passing onto the end pulley 28.

Driving means is provided for feeding the apron 27 intermittently, causing it to advance a certain distance during each feeding movement and to halt for stock cutting intervals between the feeding movements. This means includes motion transmitting mechanism which in the illustrated embodiment comprises a device of a type commonly known as a "Geneva stop" mechanism indicated generally at 34 in Figs. 1 and 3. A shaft 35, driven constantly through a speed regulating device 36 and a sprocket chain 36a from a motor (not shown), carries a disc having a pair of diametrically opposed, laterally projecting pins 37 adapted during rotation of the disc to enter radial slots in a driven member 38 and cause a partial rotation thereof during each half rotation of the disc. A member 39, rotating with the disc 36, coacts with the driven member 38 to hold the same against rotation between the periods of advance. Driven member 38 is mounted on a shaft 40 journalled in the framework and its intermittent rotative movement is transmitted to end pulley 28 of the endless apron by means of a sprocket chain 41 connecting sprockets on shafts 30 and 40.

For removing the strip of surplus stock, indicated at B, after the parts have been cut from the strip A, a stripping device is provided, comprising an endless belt 42 connecting end pulleys 43 and 44 the first of which is journalled in an overhead support and the latter of which is journalled in brackets secured to the main framework. Belt 42 is adapted to strip and lift the surplus stock B and carry it upward to a point where it is delivered to an overhead return conveyor belt 47 for return as scrap or for other disposal. Belts 42 and 47 are driven by sprocket chains 48 and 49, respectively, which are driven through a speed transmission device 50 from a sprocket chain 51 which receives intermittent movement from end-pulley shaft 30 through suitable gearing 52. The surplus stock B may thus be stripped from the cut articles by intermittent movement corresponding to the intermittent feed of the conveyor apron, and the speed of the stripping belt 42 relative to the apron may be varied in accordance with the elasticity of the strip B for most efficient stripping.

It is desirable to provide a presser roller 45 journalled in brackets mounted on the supporting framework between the cutting apparatus 10 and the stripping belt 42 preferably close to the latter. This roller lies transversely across the apron in light contact with the strip stock and facilitates efficient stripping in a manner which will be explained more fully hereinafter. Pivotally mounted in brackets mounted on the framework adjacent the apron near the delivery side of the stripping device are a pair of stud rollers 46, 46 (Figs. 1 and 3) which overlie the marginal portions of the apron and facilitate efficient stripping in a manner which will be explained more fully hereinafter.

The cutting mechanism is driven through its shaft indicated at 26, by means of a sprocket chain 53 from the power shaft 35 which, as it will be remembered is constantly driven. The arrangement is such that the ram 23 of the cutting press is raised to cause the strip stock to be pressed against the cutting dies when the endless apron is at rest between feeding movements, and is lowered to free the stock from the dies for each feeding movement.

Provision is made for protecting the endless apron from the action of the cutter dies and for facilitating removal of the cut parts after the cutting operation. A plurality of boards 54, 54, of uniform size and shape and preferably of stiff fibrous material, are interposed consecutively along the apron 27 between it and the strip stock A before the latter reach the cutting station, and these boards serve not only as a backing for the dies to cut against but serve also as trays for the cut parts, permitting easy removal of them from the apron without direct manual contact with the cut parts.

For the purpose of inserting the boards between the stock and apron the apparatus comprises an auxiliary endless conveyor belt 55 mounted in a frame superstructure, indicated at 56, and having its end pulleys 57 and 58 pivoted in brackets 57$^a$ and 58$^a$ which are mounted on the main framework in positions such that end pulleys lie closely adjacent the apron. Course deflecting rollers 59, 60, 61, 62 and 63 are pivoted in brackets mounted on the superstructure 56 in such arrangement as to cause the strip stock A to be separated from the apron at pulley 57, raised above the apron by the auxiliary belt to provide a board-inserting space 64, and returned to the apron with boards interposed therebetween. Auxiliary belt 55 is driven intermittently at a speed corresponding to the feed of the apron 27 by means of a sprocket chain 65 connecting the shaft of end pulley 57 of the auxiliary belt with the shaft of end pulley 29 of the apron.

Mechanism is provided for positioning the boards 54 on the apron so that each in its turn will be aligned properly with the cutting dies. As shown most clearly in Fig. 2, the apron supporting table 32 is divided into two longitudinal portions which are spaced apart at 66 to accommodate an apron supporting roller 67 rotatably mounted in the lower part of the superstructure 56. Above the conveyor belt in vertical alignment with roller 67 is positioned another roller 68 the shaft of which is journalled in bearings which are mounted for vertical movement in the superstructure and by means of springs 69, 69 are urged downward. Roller 67 and roller 68 are so spaced as to exert a pinching pressure on a board and the apron interposed between them.

The main framework comprises a pair of longitudinally extending channel tracks 70, 70 in which four rollers 71, 61 of a carriage 72 are adapted to travel, permitting the carriage to reciprocate fore and aft directly beneath the apron supporting table 32. The carriage is provided near its right hand end, as viewed in Figs. 1 and 2, with upstanding arms 73, 73 spaced from the opposite sides of the table 32 and apron 27 and carrying at their upper ends a transverse, apron-straddling bar 74 (see also Fig. 5). Bar 74 is provided with rearwardly extending lugs 74$a$, 74$a$ having transverse pivot pins 74$b$, 74$b$ riding in elongated slots 73$a$, 73$a$, formed in the upstanding arms 73, 73 of the carriage, and a tension spring 74$c$, connecting bar 74 with element 73 urges the bar against elements 73 with the pins 74$b$ bearing against the bottom of slots 73$a$. The arrangement is such that the bar 74 normally lies in close proximity to or in light contact with the surface of apron 27 thus assuring engagement of the bar with the end of a board 54 placed ahead of it on the apron, even though the board may be quite thin, and on the return movement of the carriage the bar 74 is adapted to yield upwardly on engagement with any obstruction or irregularity such as might be due to roughness of the surface of the apron, to pass over the same without excessive wear of the surface of the apron, and without binding of the parts.

For causing fore and aft reciprocation of the carriage there is provided a rocking arm 75 secured at its lower end to a transverse shaft 76 journalled in the supporting framework and having at its upper end a slot 77 in which is adapted to ride a pin 78 integral with a downwardly extending lug 79 secured to the forward end of the carriage. Rocking movement is imparted to the arm 75 by means of a cam 80 rotatably mounted in the supporting framework and contacting an arm 81 secured to the shaft 76. The arm 81 is caused to bear resiliently against the cam by a tension spring 82 connecting arm 75 with the framework. Cam 80 is rotated by means of a sprocket chain 83 connecting the shaft of the cam with shaft 26 of the cutting mechanism which, as it will be remembered, is constantly rotated through sprocket chain 53 from power shaft 35.

The arrangement is such that the carriage 72 is caused to make a fore and aft board feeding stroke for each feeding movement of the apron, and the board feeding stroke of the carriage preferably commences at about the time the apron starts to move, the carriage then moving at approximately the speed of the apron until the carriage reaches the forward end of its stroke and then returning to the rearward position while the apron continues its feeding movement. During the forward travel of the carriage a board 54 previously placed ahead of it on the apron in the space 64 will be caused by back slip due to inertia, or by being deterred in its forward travel by striking roll 68, or by both of these influences, to be squared against the bar 74, which does not complete its forward travel before the board has been forced into the bight of pinch roll 68. Thus the board need not be placed accurately on the apron with the end of the board against the bar 74 but may be placed in only approximate alignment on the apron, spaced from the bar and even somewhat askew or with its forward end lying upon the rear portion of the board next ahead, and still be caused to assume a squared position against the bar 74 in a predetermined location longitudinally of the apron on completion of the forward travel of the carriage.

In Figs. 3, 5 and 6 is illustrated a structure for feeding boards onto the apron in the space 64, this structure being omitted from the other figures of the drawings for clarity of illustration of other parts. A board chute 101, suitably mounted in the superstructure and provided with vertical side portions 102, 102, has at its lower end a vertically depending skirt 103 which overlies the near marginal portion of apron 27 in close proximity thereto. At the opposite edge of the belt is a guide member 84 secured to the table 32 and positioned to overlie the adjacent marginal portion of the belt at a distance from the skirt 103 somewhat greater than the width of a board 54 so as to accommodate the latter on the apron with ample clearance at its sides.

The guide member 84 extends for a short distance longitudinally of the apron and terminates at its rear end at a point forward of the farthest position of advance of the bar 74 so as not to interfere with the reciprocation of the latter, and the skirt 103 at the opposite edge of the apron is slotted over a sufficient extent as indicated at 103a (Fig. 6) to permit reciprocating movement of the bar 74.

In order to prevent the introduction of a board into the space 64 before the next preceding board has been fed by the apron substantially clear of the space at the foot of the chute, an automatically operating closure device is provided. This comprises a short shaft 104 mounted for rotation in a bearing 105 secured to the skirt 103 and having at one end thereof an outwardly and upwardly extending closure arm 106, preferably of light sheet metal, and at its other end an actuating arm 107 preferably of light sheet metal also. The arm 106 is adapted normally to rest in a position not interfering with the passage of boards down the chute, against a stop 108 secured to the framework, and with arm 106 in this position arm 107 is arranged to extend diagonally upward in the path of a board 54a, indicated in broken lines in Fig. 5, descending from the chute onto the apron. The weight of a board descending upon arm 107 is sufficient to depress this arm to the broken line position, shown at 107a, and cause arm 106 to be raised to the broken line position 106a with its upper end extending vertically across the chute passage, the chute being slotted at 109 to permit this movement of arm 106. It will be seen that when a board is caused to slide through the chute 101 and onto the apron the closure member 106 is thus operated to bar the chute passage against a succeeding board, and that the passage will remain thus barred until the first board has been advanced by the apron over and beyond the actuating arm 107 when the closure arm 106 will be permitted to drop to its ineffective position beneath the chute. The actuating arm 107 is preferably located near the left hand side of the chute, as viewed in Fig. 3, where it may be held depressed until a board is fed substantially clear of the space at the bottom of the chute.

It is desirable to provide means for averting the contingency of two or more superimposed boards being interposed between the stock and the apron, as the cutting dies might be injured thereby. For this purpose a transversely extending bar 98 is secured to the superstructure 56 in advance of the pinch roll 68 and vertically spaced from the apron only a sufficient distance to permit one board to pass beneath it, the bar 98 being so arranged as to be engaged by the forward end of a second board which might be inadvertently superimposed upon the first, and to deter the passage of the second board until the first has been passed on from beneath it. The second board will then drop to the surface of the apron and be fed forward in proper position at the next feeding stroke of the apron, the chute closure arm 106 being held in its chute closing position, preventing the introduction of succeeding boards until the second of the boards previously introduced has been fed forward beyond the closure operating arm 107. Thus, improper positioning of the boards on the apron is prevented.

Just forward of the end pulley 58 of the auxiliary belt in the direction of feed is a presser roller 85 mounted for rotation in brackets on the supporting frame in a position to lightly press the strip stock A onto the boards 54 as the latter are fed by the apron into the bight formed by the stock descending onto the boards, and thus to cause the stock to be laid on the boards smoothly despite any jerkiness which might occur in the intermittent feed and to prevent slipping of the boards relative to the apron and stock.

The strip stock A is fed to the receiving end of the apparatus thus far described from a continuously moving conveyor 86, the delivery end of the conveyor being spaced from the apron 27 as shown in Fig. 1 to permit a festoon or storage loop C to form in the strip stock. This festoon permits continuous feed of the stock from conveyor 86 to the intermittently moving apron 27 without distortion of the stock due to the change in motion.

Festoon C is utilized also in the provision of means for coordinating the speed of apron 27 with the feeding speed of the stock supply. The strip stock may be supplied, for example, from a calender indicated at 88 and after passing through suitable devices (not shown) for cooling and shrinking the stock, as will be understood by those skilled in the art, it may be fed onto conveyor 86, which preferably is driven from the calender motor (not shown) by means of a sprocket chain 87 at a speed corresponding to that at which the calender delivers the stock.

A pair of rollers 89, 89 are adapted to ride in the festoon C, these rollers being mounted for rotation between the outer ends of a pair of side arms 90, 90, which are mounted, intermediate their ends, for rocking movement on shaft 31 of apron end pulley 29. The opposite ends of arms 90, 90 are provided with adjustably mounted counter weights 91, 91 such that the rollers 89, 89 at the outer ends of the arms are permitted to bear down lightly against the bottom of the festoon, the rollers riding lightly over the surface of the stock in a path concentric with shaft 31 and drums 29. It will be seen that as the festoon shortens, the outer portions of arms 90, 90 are caused to rise and as the festoon lengthens these portions of the arms are caused to descend.

Suitably mounted on the supporting frame is a limit switch 92 having a rockable operating member 93 lying in the path of downward movement of one of the arms 90. Also suitably mounted on the supporting frame at a point above switch 92 is a second limit switch 94 having a rockable operating member 95 extending in the path of upward movement of one of the arms 90. These limit switches by means of wires 96 and 97, respectively, are connected electrically, in a manner which will be understood by those skilled in the art, through suitable resistance devices to the driving motor of the calender 88, whereby on operation of switch 92, by contact with arms 90 in the downward movement of the latter, the calender motor will be caused to decrease its speed and slow the rate of stock supply somewhat, and on operation of switch 94 by contact with arm 90 in the upward movement of the latter, the calender motor will be caused to increase its speed and increase the rate of stock supply.

Thus the festoon C governs its own length and consequently the rate of stock feed between predetermined limits. If desired, a suitable stop switch may be associated with the upper limit switch 94, which stop switch may be connected electrically with the driving motor for the apron and cutting apparatus and be adapted to stop the operation of the latter on excessive shortening of the festoon C, to prevent injurious stretching of the strip stock in case of stoppage of the calender 88.

In operation, strip stock is fed continuously from a source such as calender 88, through suitable cooling and shrinking devices (not shown) and onto the continuously moving conveyor 86 from which the stock is fed into the festoon C. Endless apron 27, which is moved intermittently from the power shaft 35 through the stop mechanism 34, receives the strip stock from the festoon C and feeds it onto the raised auxiliary conveyor 55 from which the stock is returned to the apron at roller 85 with a procession of boards 54, 54, interposed between the stock and the apron, the boards having been introduced one by one through space 64 by means of the board feeding chute 101. At each feeding stroke of the apron a board 54 with the strip stock lying thereon is fed into alignment with the dies of the cutting mechanism 10, and at each stationary interval of the apron feed the cam 25, which is constantly rotated from the power shaft 35, causes vertical reciprocation of ram 23 of the cutting mechanism to raise the adjacent portion of the apron, with the board and the stock lying thereon, and cause cutting of the stock. Descent of the ram 23 causes the apron and board to be lowered and the stock, which adheres somewhat to the board, to be freed from the cutting dies for the next feeding stroke of the apron. Subsequent feeding strokes cause the board in its turn to pass through the stripping device where the surplus stock B is lifted and removed by endless belts 42 and 47. The boards with the cut parts, indicated at D in Figs. 1 and 3, lying thereon, pass on consecutively and may then be removed manually from the apron, the boards serving as trays for the cut parts and permitting convenient transportation to other operating stations without damage to the parts.

In the stripping operation, the roller 45 and the stud rollers 46, 46, previously referred to, serve to facilitate efficient removal of the surplus strip stock from the boards and cut parts despite any irregularities in motion which might result from the intermittent movement of the apron 27 and stripping belt 42. The stud rollers 46, 46 overlie the side margins of the apron sufficiently to engage the top surface of a passing board at its side margins, as shown in Fig. 3, to prevent objectionable lifting of the board while the tacky strip of surplus stock is being drawn therefrom. Roller 45, which presses lightly against the surface of the stock just prior to stripping, contributes to the same end, and also facilitates efficient stripping by restricting the longitudinal extent of the limited up and down heaving motion which is imparted to the apron, boards and stock in the vicinity of the cutting machine by the operation of ram 23, the roller serving as a forward fulcrum for the heaving parts. Roll 45 serves also as a fulcrum from which the surplus stock is pealed from the boards by the belt 42, the latter being vertically spaced from the boards at its nearest point of approach sufficiently for the strip stock at belt 42 to be entirely clear of the cut parts.

The stripping operation is facilitated, moreover, by the fact that the cutting edges of the dies cause the margins of the cut parts to be pressed against the surface of the board and thus cause the adhesion of the edges of the cut parts with the boards to be increased, consequently rendering it less likely that the cut parts will be drawn from the boards with the strip of surplus stock.

After the cut parts have been removed from the boards, at stations which may be remote from the cutting apparatus, the boards are returned to the main supply at a place near the chute 101. A board is manually introduced into the chute at each time when the passage closure member 101 is in its lower position, which corresponds with the time when the next preceding board has been fed by the apron clear of the space at the foot of the chute and the apron is just coming to rest for a cutting operation. The inserted board, after sliding down the chute, moves across the apron to a position indicated at 54a in Fig. 5 where further movement of the board laterally of the apron is prevented by guide abutment 84. The board then falls flat on the apron, carrying with it arm 107 to a horizontal position between the board and belt, and thus causes closure arm 106 to be rocked upward to the broken line position of Fig. 5 where its upper end blocks the passage against the immediate introduction of a succeeding board. At the next feeding stroke of the apron the board just introduced is fed forward by the apron and with the cooperation of carriage 72 and its board engaging cross bar 74, which start forward approximately simultaneously with the apron and travel at the same speed as the apron, the board is caused to be fed into the bight of the pinch roll 68 with its leading end spaced at a determinate distance from the rear end of the board ahead of it. It is not required that the board assume its ultimate position relative to the apron immediately on descent from the chute, for as before explained, the bar 74, moving in timed relation with the apron, causes the board to assume its properly adjusted position when the board is forced into the bight of the pinch roll. At the next succeeding feeding stroke of the apron the board under the pinch roll 68 is fed to a position under presser roll 85 where the strip stock is fed onto the board's upper surface. Thus, when the position of the board relative to the apron is once determined, the board is prevented by rollers 68 and 85 from slipping on the apron and, during subsequent feeding of the boards through the cutting apparatus and into the stripping device, the position of each board on the apron is retained by the continuous strip of stacky stock lying upon the boards.

Under continuous operation the speeds of the apron 27 and the calender 88 are coordinated by means of the festoon arm 90, the limit switches and the associated electrical connections. There are but three principal manual operations required, that of inserting boards into the chute, that of removing boards with the cut parts thereon from the apron, and that of replacing the die member 14 by forcing it out onto track extension 17, 17 and inserting another die member when a change in the sizes or shapes of the cut parts is desired. Consequently the operation of the apparatus is largely automatic and but few attendants are required.

Variations may be made without departing from the scope of the invention as it is defined in the following claims.

What I claim is:

1. The method of producing cut articles from plastic strip stock which comprises feeding a continuous strip of the stock while arranging a plurality of cutter backing mats consecutively along the strip at its under surface, progressively feeding the strip stock and mats past a cutting position and there cutting articles from the stock against the mats, and progressively stripping surplus strip stock from the mats, leaving the cut articles thereon.

2. The method of producing cut articles from plastic strip stock which comprises feeding a continuous strip of the stock onto a support while interposing therebetween a plurality of cutter backing mats consecutively along the strip, progressively moving the support with the mats and stock lying thereon past a cutting position and there cutting articles from the stock against the mats, and progressively stripping the surplus strip stock from the mats, leaving the cut articles thereon.

3. Apparatus of the character described comprising, in combination, a conveyor for plastic strip material, a backing mat positionable on said conveyor, and means for so guiding the strip as to permit interposing said mat between the strip material and the conveyor.

4. Apparatus of the character described comprising, in combination, a conveyor for plastic strip material, a backing mat, and means for interposing said mat between the strip material and the conveyor in a determinate position relative to the latter.

5. Apparatus of the character described comprising, in combination, a conveyor for plastic strip material, a plurality of backing mats, and means for interposing said mats between the strip material and the conveyor consecutively along the latter.

6. Apparatus of the character described comprising, in combination, a conveyor for plastic strip material, a plurality of backing mats positionable on the conveyor between it and the strip material, and means for feeding the mats consecutively onto the conveyor.

7. Apparatus of the character described comprising, in combination, a conveyor for plastic strip material, a plurality of backing mats positionable on the conveyor between it and the strip material, means for feeding the mats consecutively onto the conveyor and means for preventing the feed of a mat onto the conveyor until the mat next preceding has been advanced by the conveyor.

8. Apparatus of the character described comprising, in combination, a conveyor for plastic strip material, a plurality of backing mats, means for interposing the mats between the strip material and the conveyor including a positioning member engageable with the mats and means for moving said member in timed relation with the conveyor to position the mats consecutively along the conveyor in determinate relation therewith.

9. Apparatus of the character described comprising, in combination, a conveyor, a backing mat positionable on said conveyor, means for preventing relative movement of the mat and conveyor during advancement thereof, a member engageable with the mat and means for moving said member in timed relation with the conveyor to position the mat in association with the first said means.

10. Apparatus of the character described comprising, in combination, a conveyor for plastic strip material, a backing mat, and means posterior to the conveyor's strip receiving position for so guiding the strip material with relation to the conveyor as to provide a mat inserting space therebetween.

11. Apparatus of the character described comprising, in combination, a conveyor, a plurality of backing mats positonable consecutively on the conveyor, and means for feeding plastic strip material onto the so positioned mats.

12. Apparatus of the character described comprising, in combination, a conveyor, a plurality of backing mats positionable on the conveyor, means for positioning each of said mats in determinate relation to the conveyor, and means for feeding plastic strip material onto the so positioned mats.

13. Apparatus of the character described comprising, in combination, a conveyor, a plurality of backing mats, means for feeding said mats onto the conveyor, means for positioning said mats consecutively on the conveyor in determinate relation thereto, and means for feeding plastic strip material onto the so positioned mats.

14. Apparatus of the character described comprising, in combination, a conveyor, means for feeding plastic strip material onto said conveyor, a plurality of backing mats, means for altering the relative courses of said conveyor and strip material to provide a mat inserting space, and means at said space for positioning the mats consecutively along the conveyor in determinate positions relative thereto.

15. Apparatus of the character described comprising, in combination, a conveyor for plastic strip stock, means for feeding said conveyor intermittently past a cutting station, a plurality of cutter backing mats and means for positioning said mats between the strip material and the conveyor in such positions lengthwise of the latter as to cause them to be consecutively presented at the cutting station during the stationary intervals of the conveyor feed.

16. Apparatus as defined in claim 15 comprising means for progressively stripping at least a portion of the outgoing strip stock from the mats.

17. Apparatus of the character described comprising, in combination, a conveyor adapted to feed plastic strip stock past a cutting station, a cutter backing mat positionable on said conveyor, means for interposing said mat between incoming strip stock and said conveyor, and means for stopping the conveyor to present said mat and stock lying thereon at the cutting station.

18. Apparatus of the character described comprising, in combination, a conveyor adapted to feed plastic strip stock past a cutting station, a plurality of cutter backing mats positionable on the conveyor, means for interposing said mats consecutively between incoming strip stock and said conveyor and means for progressively stripping at least a portion of the outgoing strip stock from the mats.

19. Apparatus of the character described comprising, in combination, a conveyor adapted to feed plastic strip stock past a cutting station, a plurality of cutter backing mats positionable between incoming strip stock and the conveyor consecutively along the latter, and mechanism for progressively stripping surplus outgoing stock from the mats, said mechanism comprising means for preventing relative movement of the mats and conveyor.

20. Apparatus of the character described comprising, in combination, a conveyor for plastic strip material, a plurality of backing mats, means for interposing said mats between the strip material and the conveyor consecutively along the latter and means for preventing a mat to be so interposed in face to face relation with another mat.

In witness whereof I have hereunto set my hand this 26th day of May, 1931.

JOHN H. FLINK.